US008138441B2

(12) United States Patent
Forenz et al.

(10) Patent No.: US 8,138,441 B2
(45) Date of Patent: Mar. 20, 2012

(54) STEP-DOWN PLUNGE ELECTRODISCHARGE MACHINING

(75) Inventors: Dominick John Forenz, Hammondsport, NY (US); Mark Lee Humphrey, Elmira, NY (US); Bruce Edwin Klingensmith, Jr., Alexandria, PA (US)

(73) Assignee: Corning Incorporated, Corning, NY (US)

(*) Notice: Subject to any disclaimer, the term of this patent is extended or adjusted under 35 U.S.C. 154(b) by 1091 days.

(21) Appl. No.: 12/004,545

(22) Filed: Dec. 21, 2007

(65) Prior Publication Data

US 2008/0223828 A1  Sep. 18, 2008

Related U.S. Application Data

(60) Provisional application No. 60/876,757, filed on Dec. 22, 2006.

(51) Int. Cl.
B23H 1/00 (2006.01)
B23H 7/30 (2006.01)
(52) U.S. Cl. .................................. 219/69.17; 219/69.16
(58) Field of Classification Search ............... 219/69.15, 219/69.17, 69.2, 69.16; 205/651, 652, 654; 204/224 M; 408/1 R
See application file for complete search history.

(56) References Cited

U.S. PATENT DOCUMENTS

| 3,366,770 | A | * | 1/1968 | Blatt et al. | 219/69.16 |
| 4,363,627 | A | * | 12/1982 | Windeler | 219/69.17 |
| 4,441,004 | A | * | 4/1984 | Inoue | 219/69.17 |
| 4,459,190 | A | * | 7/1984 | Inoue | 204/224 M |
| 4,872,787 | A | * | 10/1989 | Arai et al. | 408/1 R |
| 5,267,141 | A | * | 11/1993 | Morita et al. | 219/69.16 |
| 5,461,211 | A | * | 10/1995 | Yoshidaa et al. | 219/69.17 |
| 5,997,720 | A | | 12/1999 | Brew et al. | 205/646 |
| 6,521,856 | B1 | | 2/2003 | Marchesi et al. | 219/69.13 |
| 6,680,454 | B1 | | 1/2004 | Batzinger et al. | 219/69.15 |
| 6,734,384 | B2 | | 5/2004 | Barbulescu | 219/69.14 |
| 6,843,822 | B2 | | 1/2005 | Beall et al. | 55/523 |
| 6,857,828 | B2 | * | 2/2005 | Weber et al. | 408/1 R |
| 2002/0113042 | A1 | * | 8/2002 | Masaki et al. | 219/69.2 |
| 2002/0162824 | A1 | * | 11/2002 | Tricarico et al. | 219/69.17 |
| 2003/0173337 | A1 | * | 9/2003 | Ito | 219/69.15 |
| 2004/0217090 | A1 | * | 11/2004 | Spitza | 219/69.15 |
| 2005/0198822 | A1 | | 9/2005 | Hironaga et al. | 29/890 |
| 2005/0218089 | A1 | | 10/2005 | Wei et al. | 210/805 |
| 2005/0274097 | A1 | | 12/2005 | Beall et al. | 55/523 |

FOREIGN PATENT DOCUMENTS

| EP | 0709159 A1 | 10/1995 |
| JP | 63028520 | 6/1988 |
| JP | 9-29546 A * | 2/1997 |
| JP | 2000-263334 | 9/2000 |

* cited by examiner

*Primary Examiner* — Geoffrey S Evans
(74) *Attorney, Agent, or Firm* — Matthew B. McNutt; Joseph M. Homa (57) ABSTRACT

A method of machining a pattern at a plurality of locations in a workpiece includes positioning a shaped electrode including the pattern at the plurality of locations in a sequence. In some embodiments, the sequence is random. The method further includes forming the pattern at each of the plurality of locations by passing electrical charges repeatedly between the shaped electrode and the workpiece and advancing the shaped electrode into the workpiece for a fraction of a full depth of the pattern. The method further includes repeating the positioning and forming steps a plurality of times until the full depth of the pattern has been formed at each of the plurality of locations.

20 Claims, 6 Drawing Sheets

STEP-DOWN PLUNGE ELECTRODISCHARGE MACHINING

RELATED APPLICATIONS

This application claims the benefit of U.S. Provisional Application No. 60/876,757, filed Dec. 22, 2006, entitled "Step-Down Plunge Electrodischarge Machining," the disclosure of which is hereby incorporated by reference herein.

BACKGROUND

The invention relates generally to electrodischarge machining (EDM) processes. More particularly, the invention relates to plunge EDM for making a honeycomb extrusion die.

Honeycomb bodies used in particulate filtration applications, such as diesel exhaust filtration applications, consist of a monolith body having longitudinal, parallel channels defined by longitudinal interconnected webs. The honeycomb bodies are typically made by extrusion from a ceramic material such as cordierite or silicon carbide. Extrusion dies used in making the honeycomb bodies have a die body with a discharge end including an array of longitudinal pins defined by interconnected slots. The array of longitudinal pins may include pins having any geometry useful in particulate filtration applications, such as square, triangle, or hexagon. The inlet end of the die body includes feedholes, which extend from the base of the die body to the slots and are used to supply batch material to the slots. To make a honeycomb body using the extrusion die, batch material is supplied to the feedholes and extruded through the slots. The batch material extruded through the slots form the interconnected webs of the honeycomb body.

Honeycomb extrusion dies are commonly made by plunge EDM. In a typical plunge EDM process, a shaped electrode having the desired pin/slot pattern is placed in contact with a workpiece. A voltage is applied across the shaped electrode and the workpiece to cause current to flow between them through a fluid electrolyte. In some processes, the shaped electrode acts as a cathode and the workpiece acts as an anode; in other processes, and depending under some circumstances on the composition of the electrode, the current flow may be reversed. The pin/slot pattern is formed in the workpiece by a series of repetitive electrical charges discharged in a thin gap between the shaped electrode and the workpiece. The electrical charges generate enough heat to melt the workpiece and transfer the pin/slot pattern to the workpiece. While machining the workpiece, the workpiece is immersed in dielectric fluid, which acts as a conductor for the electrical charges and at the same time insulates the shaped electrode from the workpiece. The dielectric fluid also serves as a coolant and is used to flush machined chips out of the thin gap between the shaped electrode and the workpiece.

While plunge EDM lends itself well to making machining pins and slots of various shapes and sizes within the same die body, a significant amount of variation in slot width and pin size within a machined die body has also been observed. This may be due to inadequate flushing of machined chips while forming the pin/slot pattern. Unflushed chips in a machining zone of the workpiece can create secondary discharges that could affect the width of the slots and size of the pins formed in that zone. Furthermore, the amount of unflushed chips varies from one machining zone to the next so that variation in slot width and pin size is not uniform across the workpiece, making it difficult to compensate for the effect of secondary discharges on slot width and pin size. Variation in slot width and pin size across the extrusion die translates to variation in web thickness and cell size across the honeycomb body formed with the extrusion die. Significant variation in web thickness and cell size across the honeycomb body can create an undesired thermal distribution profile and/or flow distribution profile in the honeycomb body during subsequent processing or use of the honeycomb body.

Thus there is a desire for a plunge EDM process that forms patterns in a workpiece with uniform variation in pattern size across the workpiece, wherein the variation can be controlled to meet manufacturing tolerances.

SUMMARY

In one aspect, the invention relates to a method of machining a pattern at a plurality of locations in a workpiece which comprises positioning a shaped electrode including the pattern at the plurality of locations in a randomized sequence, forming the pattern at each of the plurality of locations by passing electrical charges repeatedly between the shaped electrode and the workpiece and advancing the shaped electrode into the workpiece for a fraction of a full depth of the pattern, and repeating the positioning and forming steps a plurality of times until the full depth of the pattern has been formed at each of the plurality of locations.

In another aspect, the invention relates to a method of plunge electrodischarge machining a pattern at multiple plunge locations in a workpiece which comprises determining a full depth of the pattern to be machined at the multiple plunge locations, selecting the total number of plunge steps to machine the pattern to the full depth, and determining a plunge depth for each plunge step as a fraction of the full depth. For each plunge step, the method includes randomly generating a sequence of plunge locations and machining the pattern in the workpiece at the plunge locations to the plunge depth associated with the plunge step according to the sequence of plunge locations.

In another aspect, the invention relates to a plunge electrodischarge machining system which comprises a first fixture in which at least one shaped electrode having a pattern is arranged, a second fixture adapted for supporting a workpiece in opposing relation to the shaped electrode, a positioning device coupled to the shaped electrode, and a power supply configured to apply a voltage across the shaped electrode and the workpiece. The system further includes a control device which controls the positioning device such that the shaped electrode is repeatedly positioned at a plurality of locations in the workpiece in randomized sequences to form a fraction of a full depth of the pattern in the workpiece at the plurality of locations.

Other features and advantages of the invention will be apparent from the following description and the appended claims.

BRIEF DESCRIPTION OF THE DRAWINGS

The accompanying drawings, described below, illustrate typical embodiments of the invention and are not to be considered limiting of the scope of the invention, for the invention may admit to other equally effective embodiments. The figures are not necessarily to scale, and certain features and certain view of the figures may be shown exaggerated in scale or in schematic in the interest of clarity and conciseness.

DETAILED DESCRIPTION

The invention will now be described in detail with reference to a few preferred embodiments, as illustrated in the accompanying drawings. In describing the preferred embodiments, numerous specific details are set forth in order to provide a thorough understanding of the invention. However, it will be apparent to one skilled in the art that the invention may be practiced without some or all of these specific details. In other instances, well-known features and/or process steps have not been described in detail so as not to unnecessarily obscure the invention. In addition, like or identical reference numerals are used to identify common or similar elements.

Figure 1:
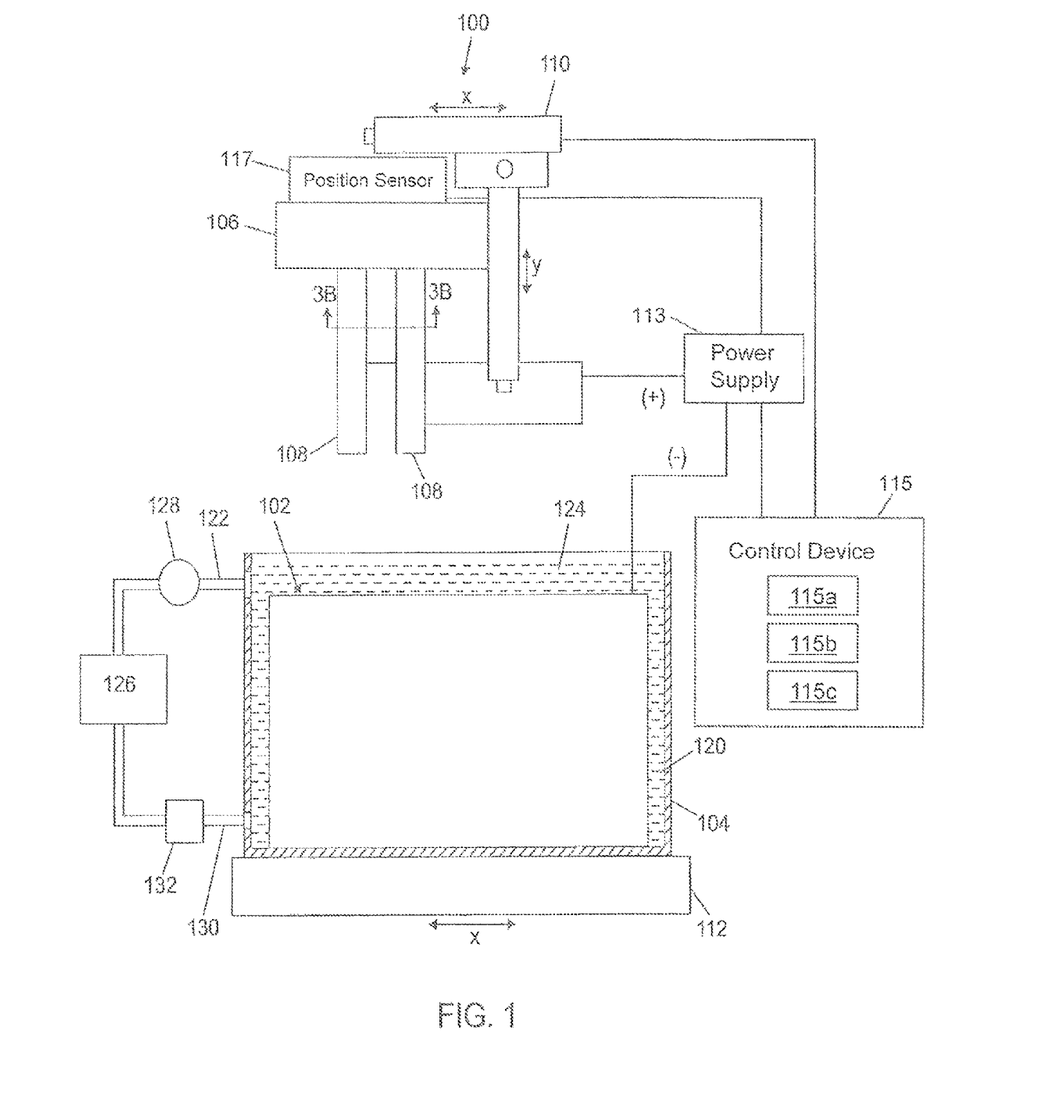
FIG. 1 is a simplified diagram of a plunge EDM system.

FIG. 1 is a simplified diagram of a plunge EDM system 100 for machining patterns, such as slot and pin patterns, across a workpiece 102. Typically, these patterns have features with high aspect ratio, but the system is not limited to features having a high aspect ratio. The system 100 includes a lower fixture 104 that holds the workpiece 102. The system 100 further includes an upper fixture 106 arranged in opposing relation to the lower fixture 104. The upper fixture 106 holds and supports one or more shaped electrodes 108 in opposing relation to the workpiece 102. The shaped electrodes 108 may be held in the upper fixture 106 using any suitable means. For example, the shaped electrodes 108 could be inserted in apertures in the upper fixture 106 and fixed thereto by any suitable means, such as welds or threads.

The upper fixture 106 is movable relative to the lower fixture 104 so that the shaped electrodes 108 can be positioned to machine features across the workpiece 102 and so that the shaped electrodes 108 can be advanced or plunged into the workpiece 102 as the features are machined to full depth. This could be implemented, for example, by coupling a positioning device 110, such as an actuator(s) or translation stage(s), to the upper fixture 106. In one example, the positioning device 110 provides motion along two orthogonal axes, e.g., in the x and y directions. This would allow lateral and vertical motion of the shaped electrodes 108 relative to the workpiece 102. Alternatively, the positioning device 110 may provide motion along three orthogonal axes and may allow angular adjustment of the shaped electrodes 108 as necessary. Preferably, the positioning device 110 is controllable. Preferably, the positioning device 110 can position the shaped electrodes 108 across the workpiece 102 with high precision. It is also possible to couple a positioning device 112 to the lower fixture 104 so that the workpiece 102 is movable relative to the shaped electrodes 108. In this case, the positioning device 110 need provide motion only in the vertical direction.

The plunge EDM system 100 includes a power supply 113 for applying a voltage across the workpiece 102 and the shaped electrodes 108. In the configuration illustrated in FIG. 1, the shaped electrodes 108 act as cathodes and the workpiece 102 acts as an anode. Preferably, the output of the power supply 113 is adjustable. The system 100 may include a control device 115 that determines the amount of voltage applied across the shaped electrodes 108 and the workpiece 102. The voltage applied across a shaped electrode 108 and the workpiece 102 determines the electrical discharge between the shaped electrode 108 and the workpiece 102 and the size of the gap formed between the shaped electrode 108 and the workpiece 102. The control device 115 may also control the positioning device 110 to move the shaped electrodes 108 to machine features at various locations in the workpiece 102. The control device 115 may receive input from a position sensor 117 coupled to the upper fixture 106, or from the positioning device 110, and use the input to determine when features have been machined to full depth in the workpiece 102. The control device 115 may include memory 115a for storing data and instructions, processor 115b for executing instructions, and input/output devices 115c for communicating with the various components of the plunge EDM system 100.

In the system illustrated in FIG. 1, the lower fixture 104 is provided with a fluid chamber 120 for holding dielectric fluid 124. The plunge EDM system 100 may include an inlet line 122 through which dielectric fluid 124 from a dielectric fluid source 126 can be supplied into the chamber 120. A pump 128 may be provided in the inlet line 122 to pump dielectric fluid 124 from the dielectric fluid source 126 into the chamber 120. The system 100 may include a discharge line 130 through which dielectric fluid 124 can be withdrawn from the chamber 120 and returned to the dielectric fluid source 126. A particulate filter 132 may be provided in the discharge line 130 to remove chips from the dielectric fluid 124 prior to returning the dielectric fluid 124 to the dielectric fluid source 126. The lower fixture 104 supports the workpiece 102 in the chamber 120 such that the workpiece 102 is immersed in the dielectric fluid 124. The dielectric fluid 124 is circulated through the chamber 120 while features are machined in the workpiece 102. The dielectric fluid 124 conducts electrical charges from the shaped electrode 108 to the workpiece 102 while also insulating the shaped electrode 108 from the workpiece 102. The dielectric fluid 124 also flushes chips from the gap formed between the workpiece 102 and the shaped electrode 108. Although not shown in FIG. 1, system modifications are known that additionally provide for circulation of the dielectric fluid through channels in electrodes 108 as well as through open channels provided in workpiece 102, such circulation being particularly effective to assist in the flushing of chips from that gap and from slot depressions being machined into the workpiece.

The shaped electrodes 108 are positioned for machining features in the workpiece 102 through repetitive electrical charges discharged into a gap between the shaped electrodes 108 and the workpiece 102. The shaped electrodes 108 are made of a conductive material. The workpiece 102 is also made of a conductive material. The material for the workpiece 102 may be selected based on the intended application of the machined workpiece. For example, for a workpiece 102 that is a blank for a honeycomb extrusion die, the workpiece 102 may be made of hard conductive materials, such as steel. The material of the shaped electrodes 108 may or may not be the same as the material of the workpiece 102 and need not be as hard as the material of the workpiece 102. Typically, the shaped electrodes 108 are made of copper-tungsten, although other electrode materials such as graphite could alternatively be used.

The shaped electrodes 108 include a pattern of the features to be formed in the workpiece 102. For example, for a honeycomb extrusion die, the shaped electrodes 108 would include a honeycomb pattern or a portion of a honeycomb pattern. Each shaped electrode 108 may be configured to form a single feature, e.g., a pin or a slot, at a time or multiple features, e.g., rows and columns of pins and slots, at a time. In general, the shaped electrode 108 may be configured to form patterns with features of any desired shape.

Figure 2:
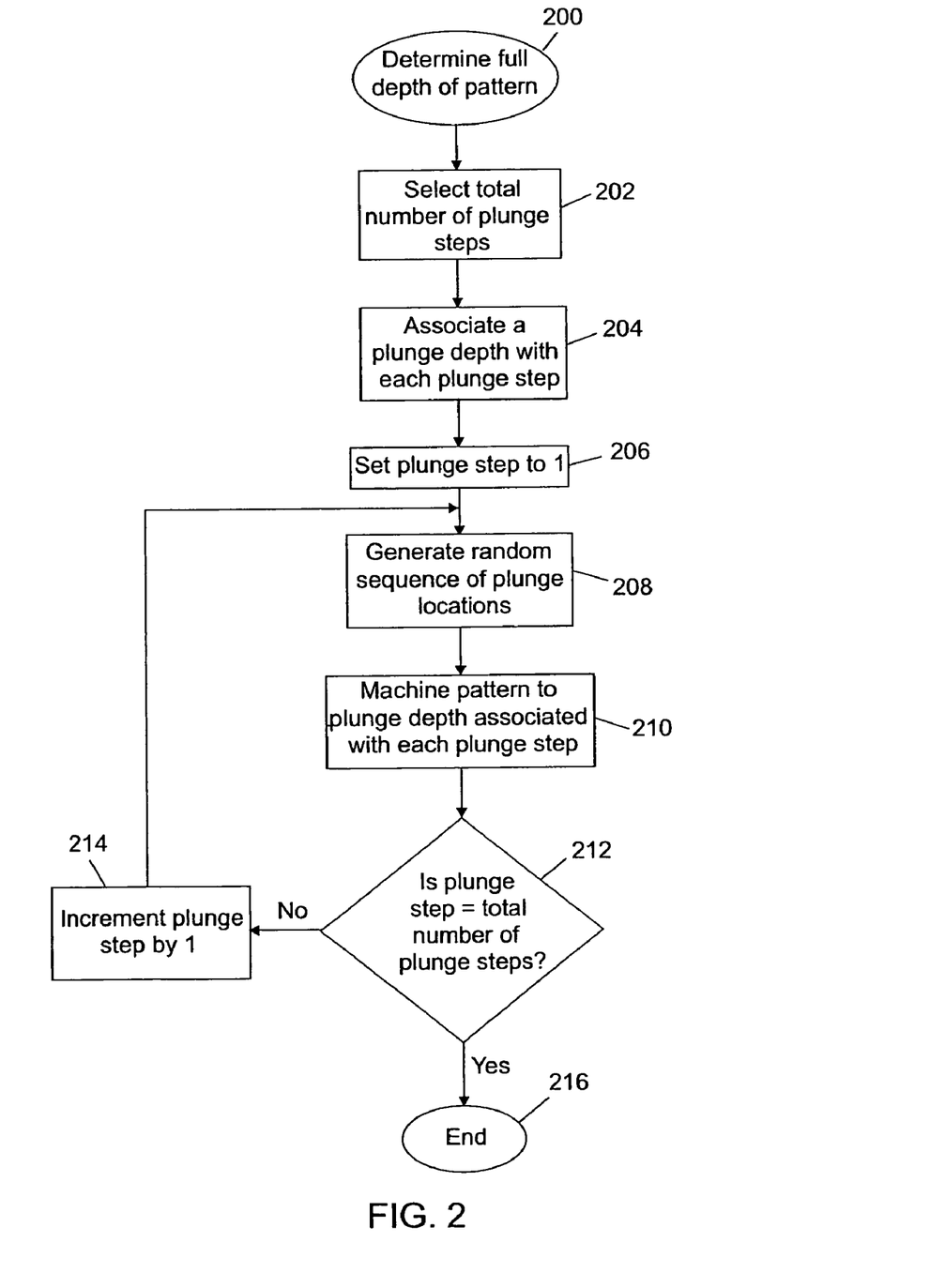
FIG. 2 is a flowchart of a step-down plunge EDM process.

The plunge EDM process is a step-down process whereby multiple plunge steps in randomized sequences are used to machine features to full depth across a workpiece. FIG. 2 illustrates the step-down plunge EDM process. First, the full depth of the pattern to be formed in the workpiece is determined (200). Next, the number of total number of plunge steps desired to machine each pattern to full depth is selected (202). This total number should be at least two, preferably greater than two, more preferably greater than five. Next, the plunge depth for each plunge step is determined (204). The plunge depth is a fraction of the full depth of the pattern that the shaped electrode would machine in the workpiece during a plunge step. The plunge depth may or may not differ from one plunge step to the next. Next, the plunge step is set to 1 (206). Next, a random sequence of plunge locations is generated (208). The plunge locations are the locations on the workpiece where the shaped electrodes would form patterns in the workpiece. For the current plunge step, patterns are machined in the workpiece for the plunge depth associated with the current plunge step according to the generated plunge sequence (210). The next step is to check if the plunge step is equal to the total number of plunge steps (212). If the plunge step is equal to the total number of plunge steps, the process is terminated (214). If the plunge step is not equal to the total number of plunge steps, the plunge step is incremented by 1 and the process is repeated from step 208. The step-down plunge EDM process may be provided as instructions that could be executed by the processor (115b in FIG. 1).

Figure 3A:
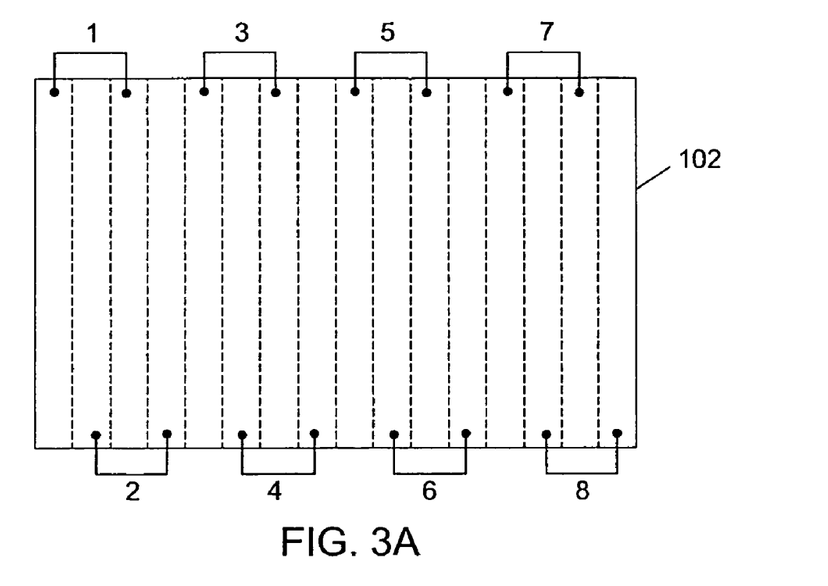
FIG. 3A depicts plunge locations on a workpiece.
Figure 3B:
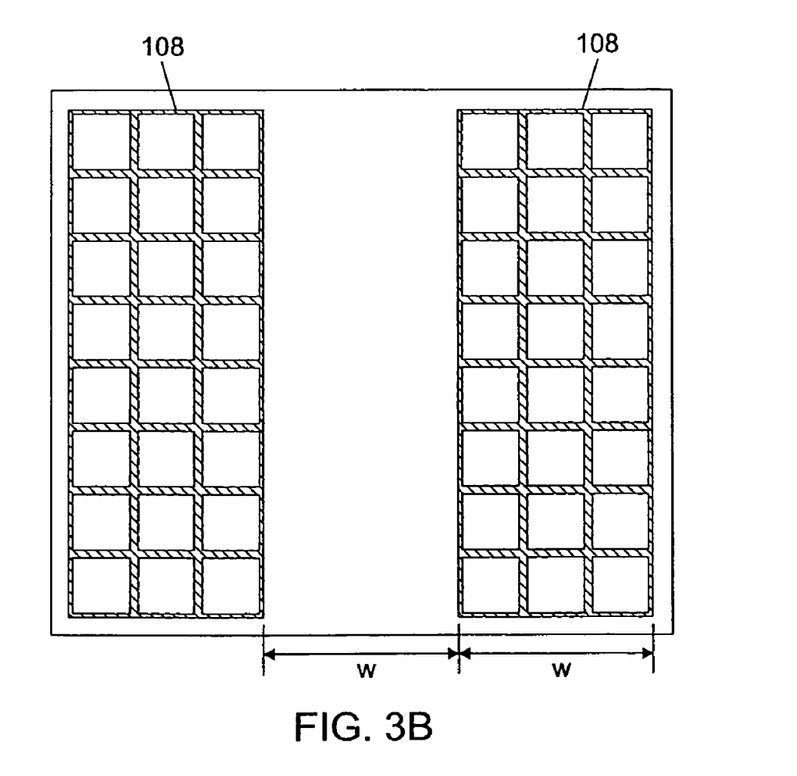
FIG. 3B is a transverse cross-section of a pair of shaped electrodes.

In one example, the pattern to be formed in a workpiece is an array of square pins and slots. The pattern is formed in the workpiece using the step-down plunge EDM process described above. The full depth of the pins and slots is 0.23 inches, and the selected number of plunge steps is 10. FIG. 3A shows the plunge locations on the workpiece 102. There are eight paired plunge locations, numbered 1-8. FIG. 3B shows the paired electrodes 108 for machining the pattern in the workpiece (102 in FIG. 3A). The electrodes 108 are separated by an electrode width w. The plunge locations 1-8 indicated in FIG. 3A each have a width equal to the electrode width w. The electrodes 108 are moved between the plunge locations 1-8 in FIG. 3A to machine the pattern, i.e., the pins and slots, in the workpiece. Table 1 below indicates plunge depth and plunge sequence for an exemplary step-down plunge machining process of this type.

Figure 4A:
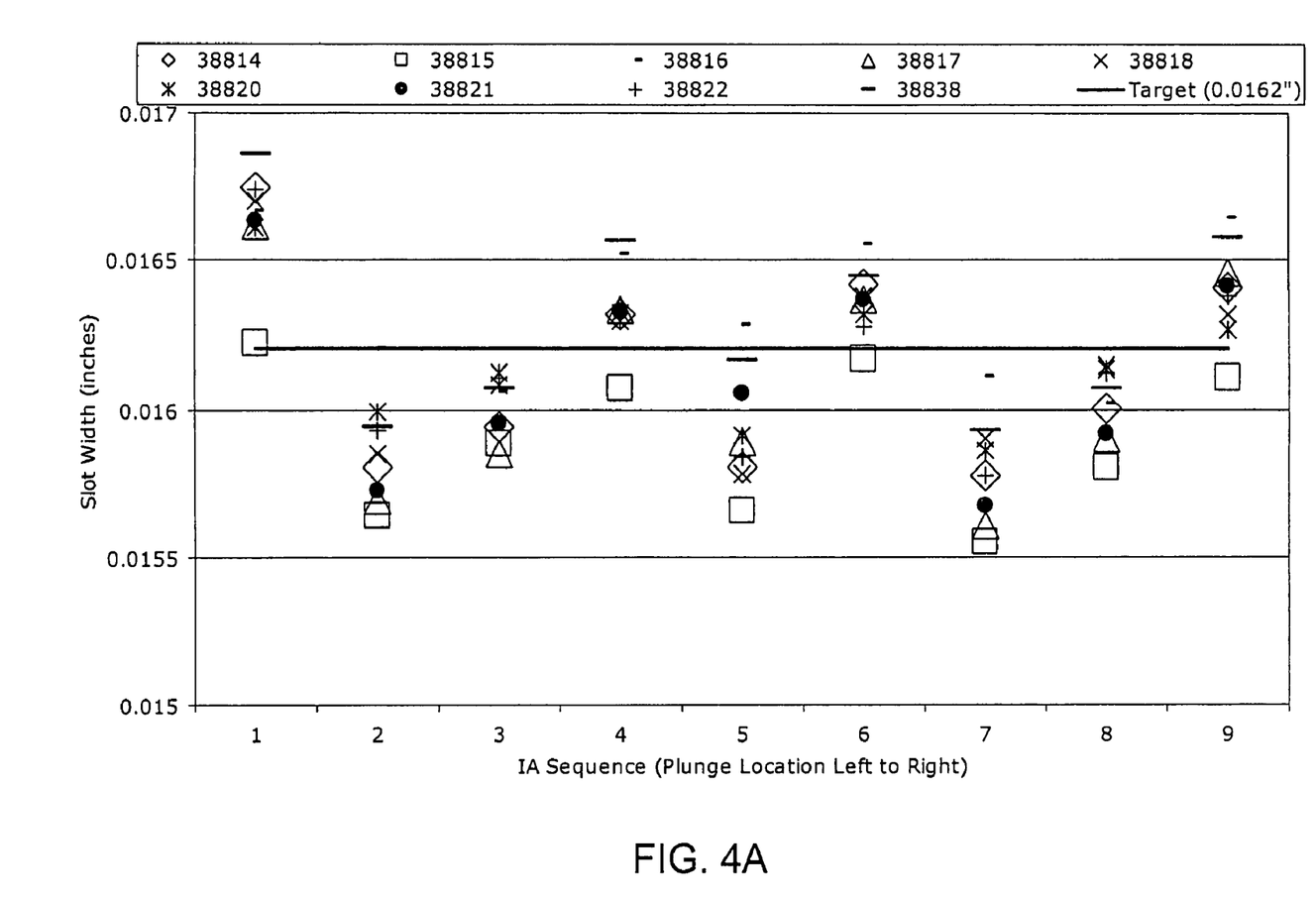
FIG. 4A is a graph illustrating slot width variability produced by a step-down plunge EDM process.

FIG. 4A presents slot width variability data taken from a series of six machined workpieces produced using the step-down sequence of Table 1. The graph of FIG. 4A plots average slot width versus measurement location for a number of locations across the machined faces of the workpieces.

TABLE 1

| Plunge Step | Depth, Inches | Plunge Location | | | | | | | |
|---|---|---|---|---|---|---|---|---|---|
| 1 | 0.025 | 1 | 8 | 3 | 6 | 2 | 7 | 4 | 5 |
| 2 | 0.050 | 5 | 4 | 7 | 2 | 6 | 3 | 8 | 1 |
| 3 | 0.075 | 6 | 3 | 8 | 1 | 5 | 4 | 7 | 2 |
| 4 | 0.100 | 2 | 7 | 4 | 5 | 1 | 8 | 3 | 6 |
| 5 | 0.125 | 8 | 1 | 6 | 3 | 7 | 2 | 5 | 4 |
| 6 | 0.150 | 4 | 5 | 2 | 7 | 3 | 6 | 1 | 8 |
| 7 | 0.175 | 3 | 6 | 1 | 8 | 4 | 5 | 2 | 7 |
| 8 | 0.200 | 7 | 2 | 5 | 4 | 8 | 1 | 6 | 3 |
| 9 | 0.225 | 1 | 8 | 3 | 6 | 2 | 7 | 4 | 5 |
| 10 | 0.230 | 5 | 4 | 7 | 2 | 6 | 3 | 8 | 1 |

Figure 4B:
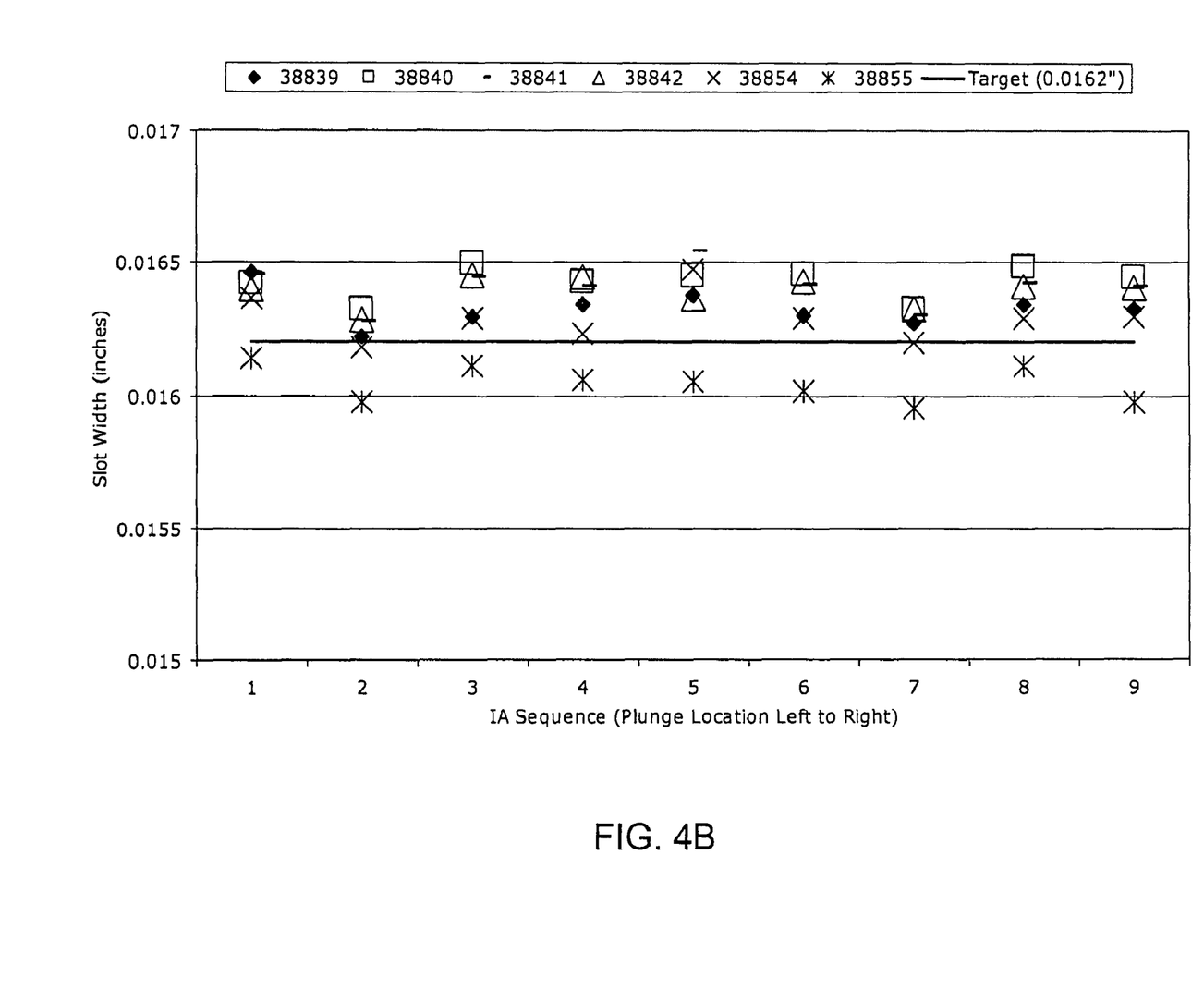
FIG. 4B is a graph illustrating slot width variability produced by a one-shot plunge EDM process.

For comparison purposes, arrays of square pins and slots as described above were machined in a series of nine additional workpieces using a one-shot plunge EDM process according to the sequence shown in Table 2 below. In the one-shot plunge EDM process, the pins and slots are machined to full depth in one step instead of incrementally as in the step-down plunge EDM process. FIG. 4B is a graph plotting average slot width as a function of measurement location across the faces of the nine workpieces produced using the one-shot plunge EDM sequence reported in Table 2. The target slot width for both machining processes is 0.0162 inches.

TABLE 2

(COMPARATIVE EXAMPLES)

| Plunge Step | Depth, Inches | Plunge Location | | | | | | | |
|---|---|---|---|---|---|---|---|---|---|
| 1 | 0.230 | 1 | 8 | 3 | 6 | 2 | 7 | 4 | 5 |

As can be observed from the graphs in FIGS. 4A and 4B, slot width across the workpiece machined by the step-down plunge EDM process is considerably more uniform than slot width across the workpiece machined by the one-shot plunge EDM process. This is because the step-down plunge EDM process is thought to insure more consistent machining conditions across the workpiece through randomization of the plunging sequence over partial slot depth increments instead of plunging to full depth with each pass. In a one-shot plunge EDM process such as outlined in Table 2, average slot widths in the first four plunge locations (Locations 1, 8, 3 and 6 positioned as in FIG. 3A) can differ considerably from average slot widths in the second four plunge locations (Locations 2, 7, 4 and 5 in FIG. 3A). This difference may be attributed at least in part to the different flushing conditions between the first four plunging locations and the second four plunging locations, since the first four locations are bounded by solid material during machining while the second four locations are not. Thus it may be more difficult to flush machined chips from the first four plunging locations, particularly with a narrow and deep design of the slots, than it would be to flush such machined chips from the second four plunging locations that are open to the previously plunged regions of the workpiece.

Figure 5:
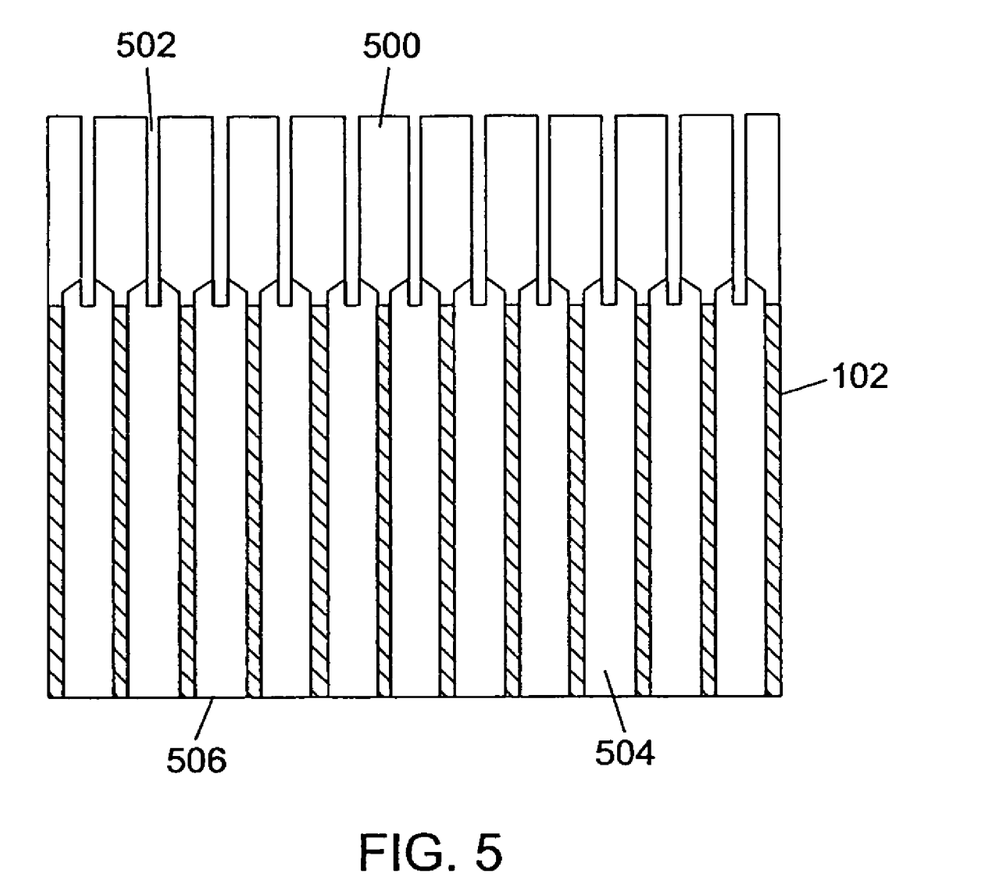
FIG. 5 is a vertical cross-section of an extrusion die.

FIG. 5 shows the workpiece 102 after forming pins 500 and slots 502 in the workpiece using a step-down plunge EDM process as described above. The pins 500 and slots 502 may be formed in the workpiece 102 in one or more phases. The first phase may be a roughing phase, where the pins 500 and slots 502 are machined to full depth using the step-down plunge EDM process. The second and subsequent phases may be finishing phases, where the pins 500 are finished to full depth. The step-down or one-shot plunge EDM process may be used for the finishing phases. To complete formation of an extrusion die, feedholes 504 can be formed in the workpiece 102. The feedholes 504 would typically extend from the base 506 of the workpiece 102 to the slots 502 in order to allow extrudable batch material to be supplied to the slots 502. The workpiece 102 with the pins 500, slots 502, and feedholes 504 may serve as a template for other honeycomb extrusion dies. For example, the pins 500 may be modified as necessary to achieve other geometries more suitable for a particular application.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of machining a pattern at a plurality of locations in a workpiece, comprising:
   positioning a shaped electrode including the pattern at the plurality of locations in a randomized sequence;
   forming the pattern at each of the plurality of locations by repeatedly discharging repetitive electrical charges between the shaped electrode and the workpiece and advancing the shaped electrode into the workpiece for a fraction of a full depth of the pattern; and
   repeating the positioning and forming steps a plurality of times until the full depth of the pattern has been formed at each of the plurality of locations.

2. The method according to claim 1, wherein the pattern is configured to form a single feature.

3. The method according to claim 1, wherein the pattern of the shaped electrode is configured to form multiple features.

4. The method according to claim 1, wherein the pattern of the shaped electrode includes a least a portion of a honeycomb feature.

5. The method according to claim 1, wherein the pattern of the shaped electrode includes a pattern selected from the group of patterns comprising: a pin, a slot, and a rows and columns of pins and slots.

6. The method of claim 5, wherein the pins and slots comprise square pins and square slots.

7. The method according to claim 1, wherein forming the pattern at each of the plurality of locations includes carrying out at least five plunge steps.

8. The method of claim 1, wherein the shaped electrode comprises an electrode pair.

9. A method of plunge electrodischarge machining a pattern at multiple plunge locations in a workpiece using a shaped electrode, comprising:
   determining a full depth of the pattern to be machined at the multiple plunge locations;
   selecting the total number of plunge steps for the shaped electrode to machine the pattern to the full depth;
   determining a plunge depth for each plunge step as a fraction of the full depth;
   for each plunge step for the shaped electrode, randomly generating a sequence of plunge locations and electrodischarge machining the pattern in the workpiece with the shaped electrode at the plunge locations to the plunge depth associated with the plunge step according to the randomly generated sequence of plunge locations.

10. The method of claim 9, wherein electrodischarge machining the pattern in the workpiece further comprises circulating dielectric fluid between the shaped electrode and the workpiece.

11. The method of claim 10, wherein the pattern is a honeycomb pattern.

12. The method of claim 11, wherein the honeycomb pattern comprises slots, and further comprising forming feedholes in the workpiece that communicate with the slots.

13. The method of claim 9, wherein the total number of plunge steps is at least two.

14. The method of claim 9, wherein electrodischarge machining the pattern further comprises applying a voltage across the shaped electrode and the workpiece, with the shaped electrode acting as a cathode and the workpiece acting as an anode.

15. The method of claim 9, wherein the shaped electrode includes a honeycomb pattern.

16. A plunge electrodischarge machining system, comprising:
   a first fixture in which at least one shaped electrode having a pattern is arranged;
   a second fixture adapted to hold a workpiece in opposing relation to the shaped electrode;
   a positioning device coupled to the shaped electrode;
   a power supply configured to apply a voltage across the shaped electrode and the workpiece; and
   a control device which controls the positioning device such that the shaped electrode is repeatedly positioned at a plurality of locations in the workpiece in randomized sequences to form a fraction of a full depth of the pattern in the workpiece at the plurality of locations.

17. The electrodischarge machining system of claim 16, wherein the second fixture is provided with a fluid chamber.

18. The electrodischarge machining system of claim 17, wherein the fluid chamber is connected to a source of dielectric fluid.

19. The electrodischarge machining system of claim 16, further comprising a sensor for monitoring a parameter related to the depth of the pattern formed in the workpiece by the shaped electrode.

20. The electrodischarge machining system of claim 16, wherein the shaped electrode is configured to form a honeycomb pattern in the workpiece.

* * * * *